US010591992B2

(12) United States Patent
Feng

(10) Patent No.: US 10,591,992 B2
(45) Date of Patent: Mar. 17, 2020

(54) SIMULATION OF CONTROL AREAS ON TOUCH SURFACE USING HAPTIC FEEDBACK

(71) Applicant: Lenovo (Singapore) Pte. Ltd., Singapore (SG)

(72) Inventor: Xin Feng, Arcadia, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 528 days.

(21) Appl. No.: 13/919,492

(22) Filed: Jun. 17, 2013

(65) Prior Publication Data
US 2014/0368445 A1 Dec. 18, 2014

(51) Int. Cl.
G06F 3/01 (2006.01)
G06F 3/0488 (2013.01)

(52) U.S. Cl.
CPC .......... G06F 3/016 (2013.01); G06F 3/04886 (2013.01)

(58) Field of Classification Search
USPC ....................................................... 345/173
See application file for complete search history.

(56) References Cited

U.S. PATENT DOCUMENTS

| 2008/0062145 | A1* | 3/2008 | Shahoian et al. ............. 345/173 |
| 2008/0068350 | A1* | 3/2008 | Rosenberg et al. ........... 345/173 |
| 2010/0156818 | A1* | 6/2010 | Burrough et al. ............. 345/173 |
| 2010/0238129 | A1* | 9/2010 | Nakanishi et al. ........... 345/173 |
| 2012/0050324 | A1* | 3/2012 | Jeong et al. .................. 345/633 |
| 2012/0249474 | A1* | 10/2012 | Pratt et al. .................... 345/174 |

* cited by examiner

*Primary Examiner* — William Boddie
*Assistant Examiner* — Andrew B Schnirel
(74) *Attorney, Agent, or Firm* — Ference & Associates LLC

(57) ABSTRACT

An aspect provides an information handling device, including: a touch sensitive surface; one or more processors; a memory device storing instructions accessible to the one or more processors, the instructions being executable by the one or more processors to: detect one or more non-operational touch inputs to the touch sensitive surface; map the one or more non-operational touch inputs to a predetermined haptic effect selected from a plurality of predetermined haptic effects mapped to regions of the touch sensitive surface; and provide the predetermined haptic effect via a haptic layer of the touch sensitive surface. Other aspects are described and claimed.

17 Claims, 7 Drawing Sheets

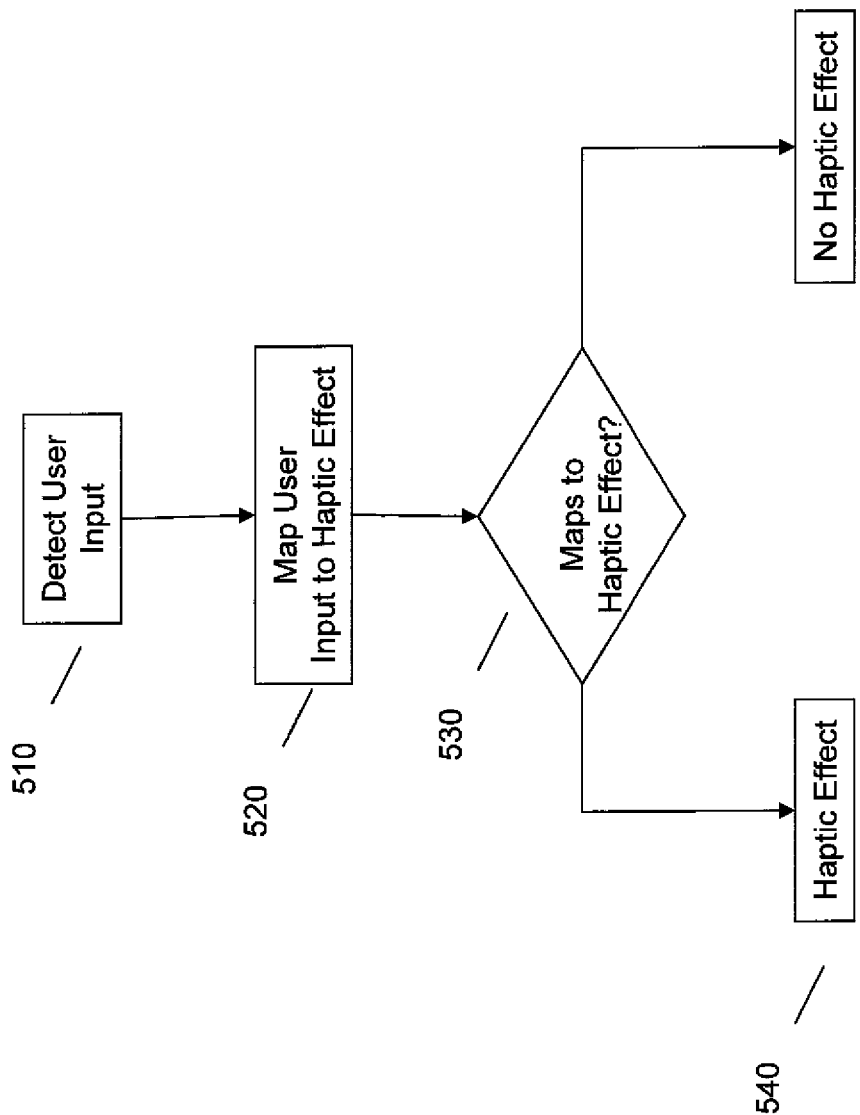

SIMULATION OF CONTROL AREAS ON TOUCH SURFACE USING HAPTIC FEEDBACK

BACKGROUND

Information handling devices ("devices") come in a variety of forms, for example laptop computing devices, tablet computing devices, smart phones, e-readers, MP3 players, and the like. Many such devices are configured for use with a touch input surface as a mode of input. In this description, "touch" or "touch sensitive" (or like variations) are used to describe a surface detecting input.

Certain form factors, e.g., tablets and smart phones, have large areas capable of accepting touch input. This is advantageous in that a large area (e.g., essentially the entire front surface) may be used to provide touch input to the device. Other devices, for example laptop computers, also include touch surfaces, e.g., in the form of a touch pad. Increasingly, devices are expanding the functionality associated with these touch surfaces because users are trending towards touch based input as a preferred input mode.

Haptic feedback is commonly used in consumer electronics to provide a global response for actions such as confirming activation of controls (e.g., press and hold of an on-screen button or location) as well as providing notifications (e.g., text message received). Haptic feedback is provided using one or more actuators or haptic layer(s). Different amplitudes, frequencies and timing may be applied to produce various forms of vibration and thus haptic feedback. For example, one vibration type may be provided to indicate a text message has been received whereas another type of vibration type may be provided to indicate a text selection action has been successfully initiated on a touch screen device. Other forms of feedback, e.g., auditory and visual feedback, are also used in various contexts.

BRIEF SUMMARY

In summary, one aspect provides an information handling device, comprising: a touch sensitive surface; one or more processors; a memory device storing instructions accessible to the one or more processors, the instructions being executable by the one or more processors to: detect one or more non-operational touch inputs to the touch sensitive surface; map the one or more non-operational touch inputs to a predetermined haptic effect selected from a plurality of predetermined haptic effects mapped to regions of the touch sensitive surface; and provide the predetermined haptic effect via a haptic layer of the touch sensitive surface.

Another aspect provides a method, comprising: detecting one or more non-operational touch inputs to a touch sensitive surface of an information handling device; mapping the one or more non-operational touch inputs to a predetermined haptic effect selected from a plurality of predetermined haptic effects mapped to regions of the touch sensitive surface; and providing the predetermined haptic effect via a haptic layer of the touch sensitive surface.

A further aspect provides a computer program product, comprising: a storage medium having computer readable program code embodied therewith, the computer readable program code comprising: computer readable program code configured to detect one or more non-operational touch inputs to the touch sensitive surface; computer readable program code configured to map the one or more non-operational touch inputs to a predetermined haptic effect selected from a plurality of predetermined haptic effects mapped to regions of the touch sensitive surface; and computer readable program code configured to provide the predetermined haptic effect via a haptic layer of the touch sensitive surface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 5 illustrates an example method of providing programmed haptic effects.

DETAILED DESCRIPTION

Figure 1:
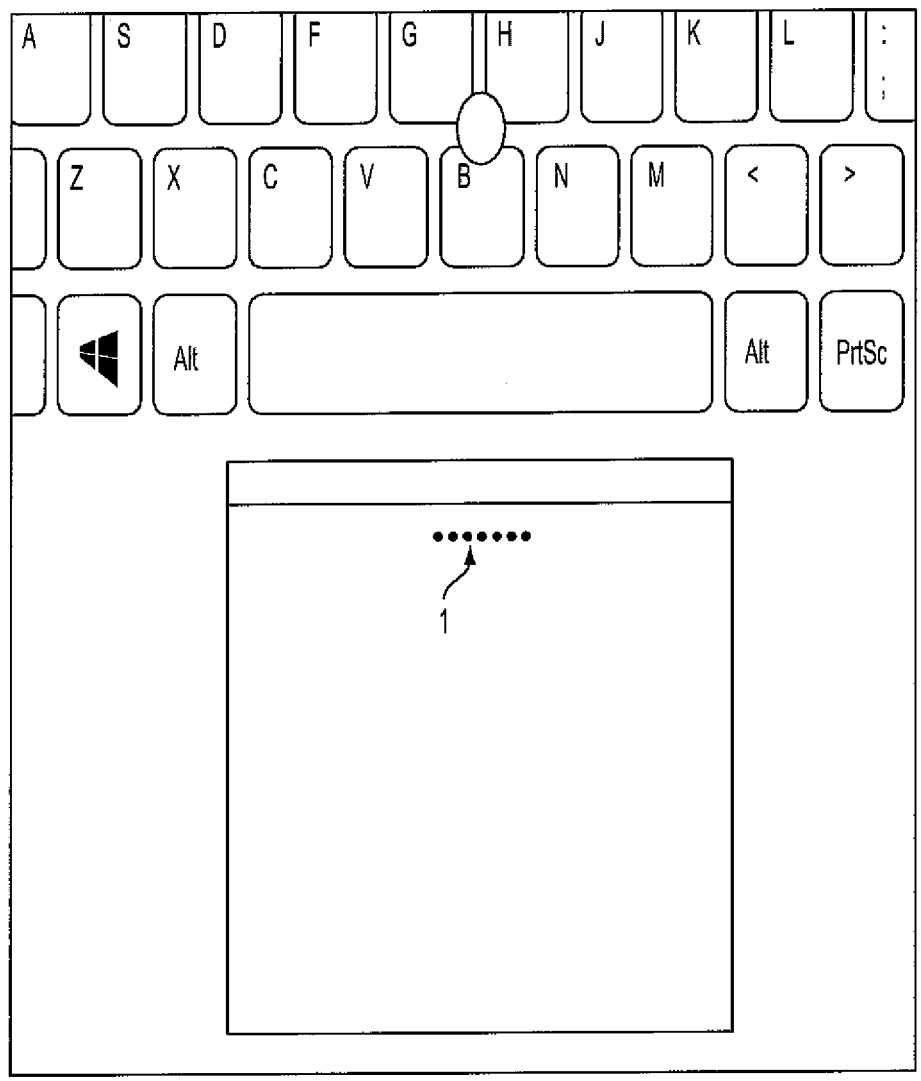
FIG. 1 illustrates an example touch pad.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While various advances in touch surface technology have been made, providing the appropriate level of feedback to a user remains challenging. This challenge is particularly acute given that touch surfaces, e.g., touch screens and touch pads, have taken on increased importance as a mode of input for devices and have grown in complexity.

For example, many laptops now come equipped with a virtual button touch pad that provides virtual buttons for input in addition to providing more conventional touch pad services (e.g., scrolling, selecting, etc.). The user of conventional virtual button touch pads however can not feel the border or different texture of the virtual button or regions there-between; thus, the user is often left guessing the exact location of such virtual buttons, where a virtual button begins and ends, etc.

As another example, as an aesthetic design choice, a clear and distinct border between touchpad and palm rest (non-touch surface) may be removed. In such situations, it is challenging for a user to detect the border between touch pad and palm. Moreover, while there may remain visual and/or audible indications of such distinctions, for certain users (e.g., those that are visually and/or audibly impaired), use of visual feedback is not helpful. A common example includes icons on touch screen. Conventionally, there is no tactile feedback when a user clicks or presses on the icons.

These examples illustrate that although the capabilities of touch surfaces have greatly increased to the advantage of many users, these same expanded capabilities often introduce usability challenges. These problems are compounded for individuals with special needs, such as the visually impaired population that is reliant on tactile feedback.

Thus, while touch pad vendors are using visual elements to identify virtual button zones, and while this gives a visual indication, it does not offer tactile feedback. For example, referring to FIG. 1, an existing touch pad uses tactile dots 1 in the TRACKPOINT middle button zone. This gives a tactile and visual indication of where the (virtual) middle button is. However, this indication is static and introduces a trade-off in that the dots 1 will only help to identify certain button zones (e.g., TRACKPOINT button zones) and does not help to identify others (e.g., touch pad button zones). Moreover, the dots 1 introduce a visual complexity and break a clear touch pad landscape. The dots 1 also break the user experience of using the area for some touch pad tasks such as multi-finger gesture without tactile interruption.

Accordingly, embodiments provide dynamic tactile feedback that assists users in operating complex touch surfaces (e.g., those including virtual buttons and/or icons and/or lacking distinct physical borders) without encumbering the user with unnecessary tactile feedback such as a fixed landmark. In one embodiment, the haptic effects provided are responsive to non-operational inputs (i.e., the haptic effect(s) are provided not as confirmatory of input action(s) executed, but rather act as tactile cues to aid the user in navigating the touch sensitive surface). Additionally or alternatively, an embodiment may provide haptic feedback or a haptic effect in response to one or more operational touch inputs.

The illustrated example embodiments will be best understood by reference to the figures. The following description is intended only by way of example, and simply illustrates certain example embodiments.

Figure 2:
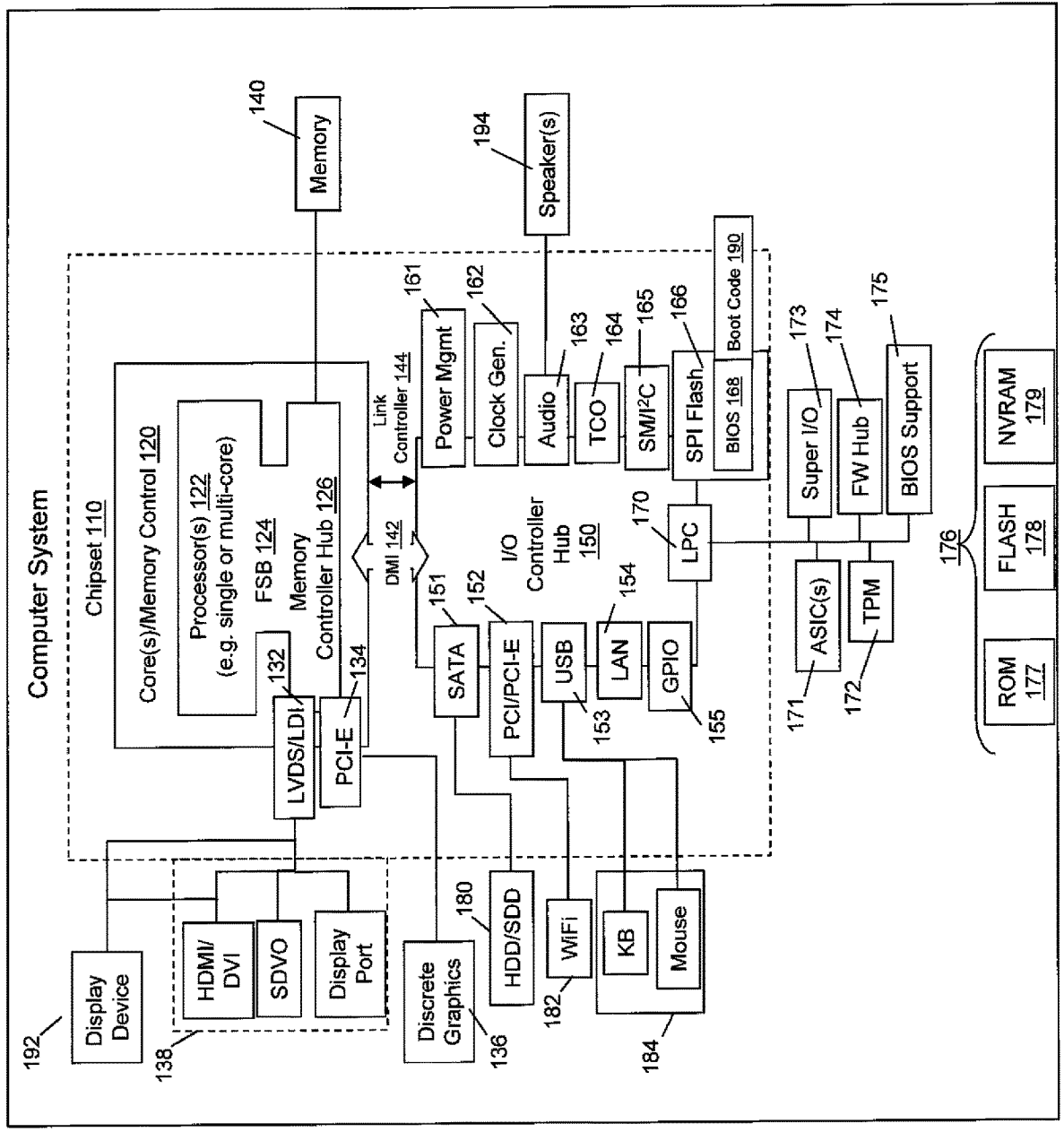
FIG. 2 illustrates an example of information handling device circuitry.
Figure 3:
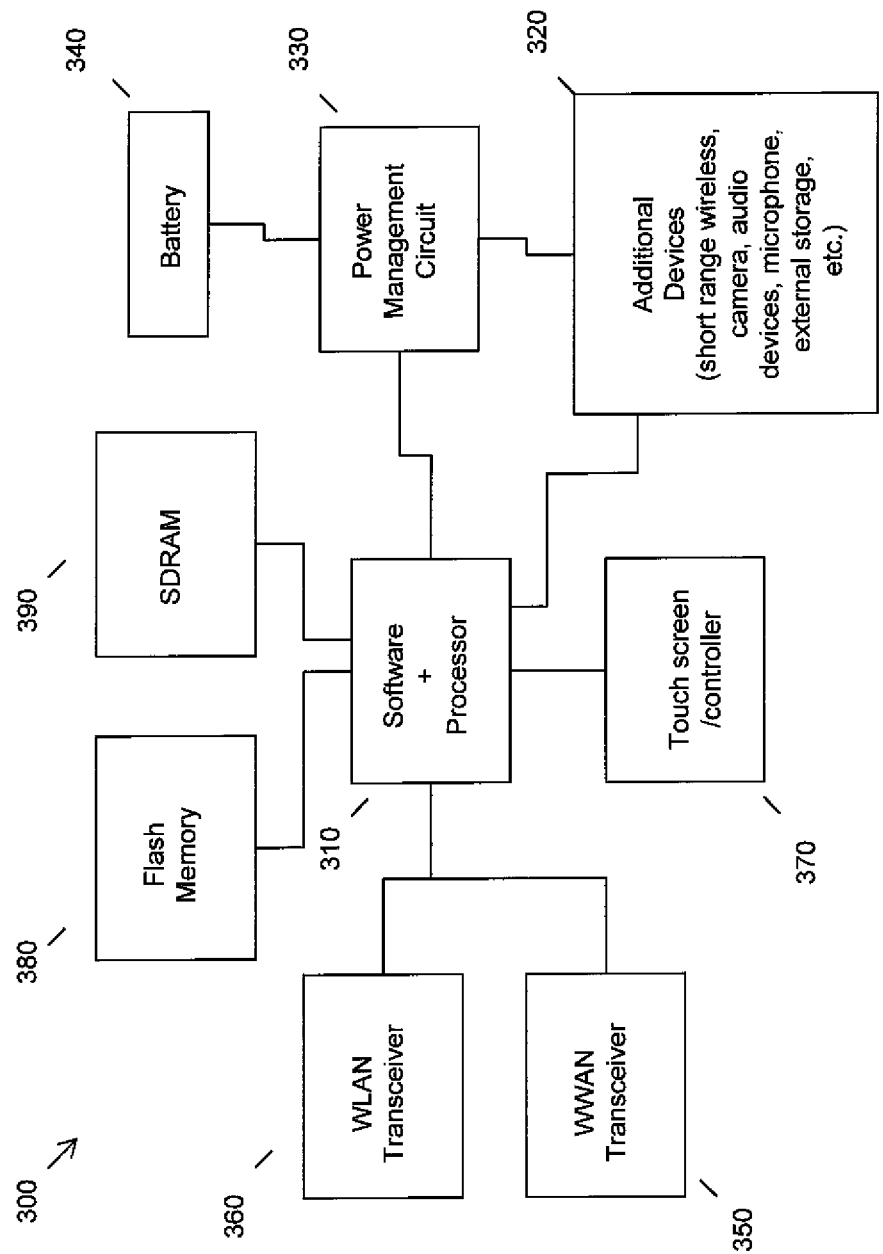
FIG. 3 illustrates another example of information handling device circuitry.

Referring to FIG. 2 and FIG. 3, while various other circuits, circuitry or components may be utilized in information handling devices, with regard to smart phone and/or tablet circuitry 300, an example illustrated in FIG. 3 includes an ARM based system (system on a chip) design, with software and processor(s) combined in a single chip 310. Internal busses and the like depend on different vendors, but essentially all the peripheral devices (320) may attach to a single chip 310. In contrast to the circuitry illustrated in FIG. 2, the tablet circuitry 300 combines the processor, memory control, and I/O controller hub all into a single chip 310. Also, ARM based systems 300 do not typically use SATA or PCI or LPC. Common interfaces for example include SDIO and I2C.

There are power management chip(s) 330, e.g., a battery management unit, BMU, which manage power as supplied for example via a rechargeable battery 340, which may be recharged by a connection to a power source (not shown). In at least one design, a single chip, such as 310, is used to supply BIOS like functionality and DRAM memory.

ARM based systems 300 typically include one or more of a WWAN transceiver 350 and a WLAN transceiver 360 for connecting to various networks, such as telecommunications networks and wireless base stations. Commonly, an ARM based system 300 will include a touch screen 370 for data input and display. ARM based systems 300 also typically include various memory devices, for example flash memory 380 and SDRAM 390.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 2, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 2, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 2, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 2.

Information handling devices, as for example outlined in FIG. 2 and FIG. 3, may provide user interfaces that accept touch input (e.g., via a touch pad for example provided with a device such as outlined in FIG. 2 or touch screen input device with a device such as outlined in FIG. 3). Embodiments provide programmable haptic feedback to a user of the touch surface. In example embodiments described herein, this feedback may take a variety of forms including but not limited to providing control identification feedback and border identification feedback.

A haptic effect is provided by embodiments to simulate the tactile feedback commonly encountered e.g., by mechanical button click or via a physical border between surfaces or controls/buttons. Haptic effects may be provided using a haptic layer, such as a SENSEG haptic layer. The haptic layer may be provided to a portion of a touch surface or sub-portions thereof. Haptic effects may be programmed and dynamically modified based on users' input (e.g., finger location, nature of input, timing of input, active applications, and the like), which may be detected e.g., by the touch surface.

Figure 4B:
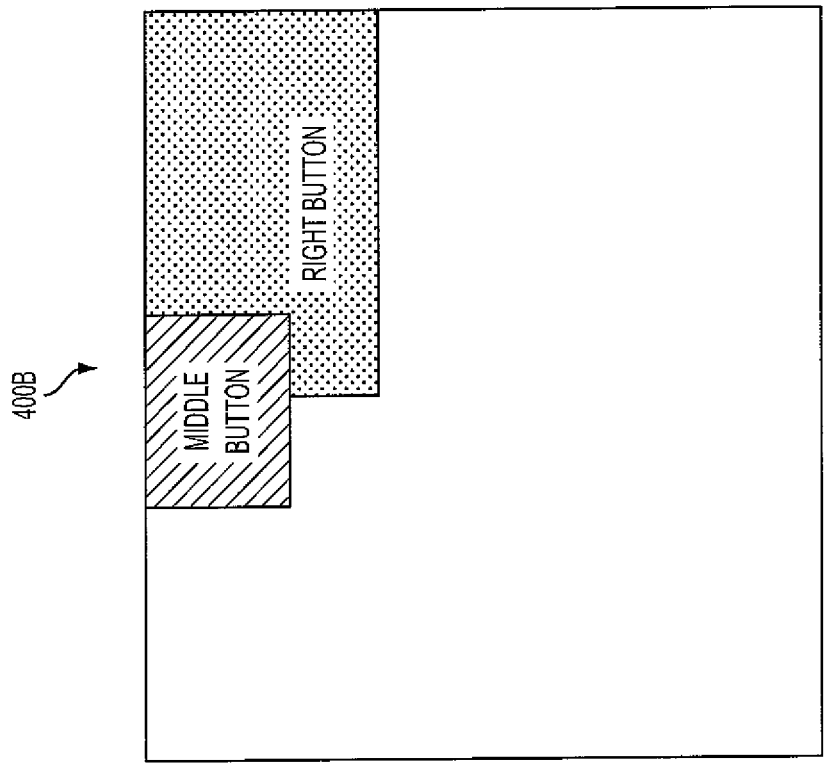
FIG. 4(A-B) illustrates example touch pads.
Figure 4A:
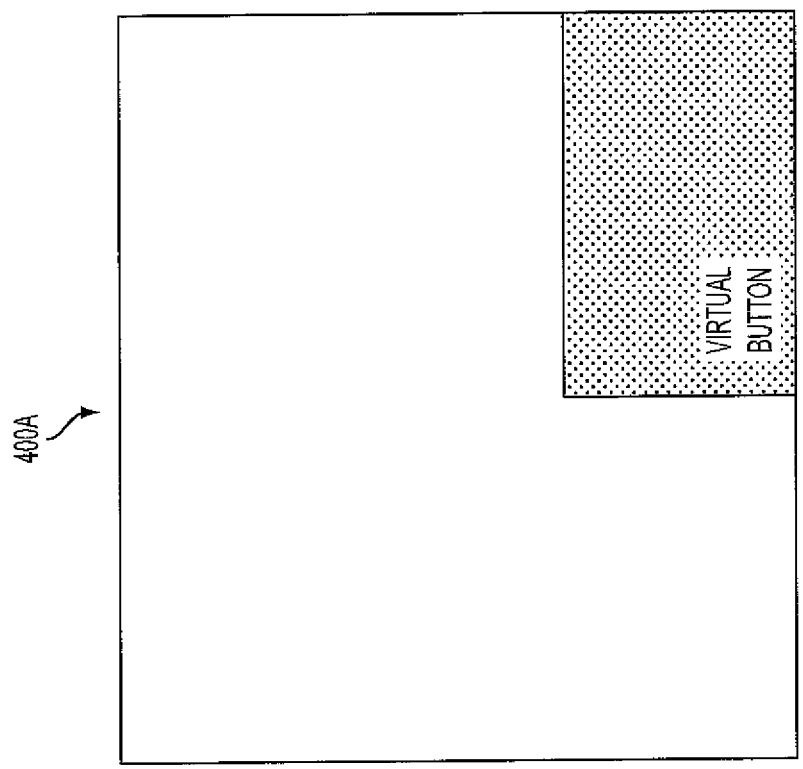

Referring to FIGS. 4A and 4B, some examples of programming include but are not necessarily limited to turning on a haptic effect (e.g., activating a haptic layer) when a user's finger is in a virtual button zone of a touch surface 400A and turning off a haptic effect when a user's finger is out of a virtual button zone. Similarly, haptic effects may be adjusted or modified in terms of magnitude, frequency, direction, or pattern, or a suitable combination of the foregoing, and may be used to simulate zone texture. Examples include but are not limited to providing haptic feedback indicative of a button zone on a touch pad and an icon on a touch screen. Thus, referring to FIG. 4B, an embodiment may provide a high magnitude, high frequency haptic effect for a middle button and a low magnitude, low frequency haptic effect for a right button of a touch surface 400B. In this way, a user may be given a tactile cue that helps the user distinguish between virtual buttons or icons on a touch surface 400B. Such haptic effects may be provided automatically, e.g., in response to a user placing a finger within a particular zone, or in response to a trigger, e.g., a user moving a finger back and forth within a zone.

Referring to FIG. 5, an embodiment may dynamically provide and/or modify the haptic effect based on a user's operation on touch surface. Thus, an embodiment detects user input at the touch surface at 510. This input is mapped to a particular pattern (e.g., region or location and/or direction within a touch pad or portion thereof) at 520. For example, an embodiment may recognize that a user has touched a virtual button zone on a touch pad, that a user has provided inputs, e.g., finger swipe, in a particular direction, or that a user has used a certain number of fingers to perform a multi-touch gesture on the touch pad surface. Responsive to the particular input detected, at 530 an embodiment determines if there is an appropriate haptic feedback or effect given the input detected. If so, an embodiment provides the feedback in the form of a haptic effect at 540, otherwise, no haptic effect may be given.

In terms of what "pattern" or input characteristic is matched or mapped, the term "pattern" does not indicate that multiple inputs are required or that a single input event is not matched or mapped to a haptic effect. Rather, an embodiment matches or maps an input or inputs based on one or more input parameters, e.g., region of input such as x and y coordinates of detected input, pressure of input, timing of input, active applications, predefined zones, predefined sequences of inputs, directionality, speed, detection of multiple inputs, combinations of the foregoing, and the like.

Examples of appropriate haptic feedback or haptic effect include but are not limited to no haptic feedback, dynamically modified haptic feedback (e.g., increasing/decreasing frequency, duration and/or magnitude) or discrete haptic feedback (e.g., a pulse or pattern of pulses). Thus, for example, when a user is tapping on a touch screen an embodiment may provide no haptic effect. Additionally, when a user is using multi-finger gesture (e.g., pinch, rotate, multiple finger swipe, etc.), an embodiment may provide no haptic effect. In contrast, when a user is clicking or pressing (e.g., with increased pressure) with one or multiple fingers, an embodiment may provide a haptic effect. Thus, an embodiment attempts to intelligently match a user's expectations based on physical experiences. Therefore, an embodiment attempts to match the haptic feedback provided with the context of user inputs. For example, a user may not want or expect haptic feedback while pinching to zoom in or out, whereas a user may want or expect haptic feedback to indicate that a click operation has been performed with sufficient pressure to activate an underlying control.

An embodiment therefore may be programmed to match haptic effects based on a user's finger pressure, which may be detected by touch surface with force sensing capability, e.g., a force pad. Examples include but are not limited to using a detection of a user's finger pressure as a co-efficient for modifying haptic effect. For example, the higher the user's finger pressure is, the greater the haptic effect will be.

Figure 6A:
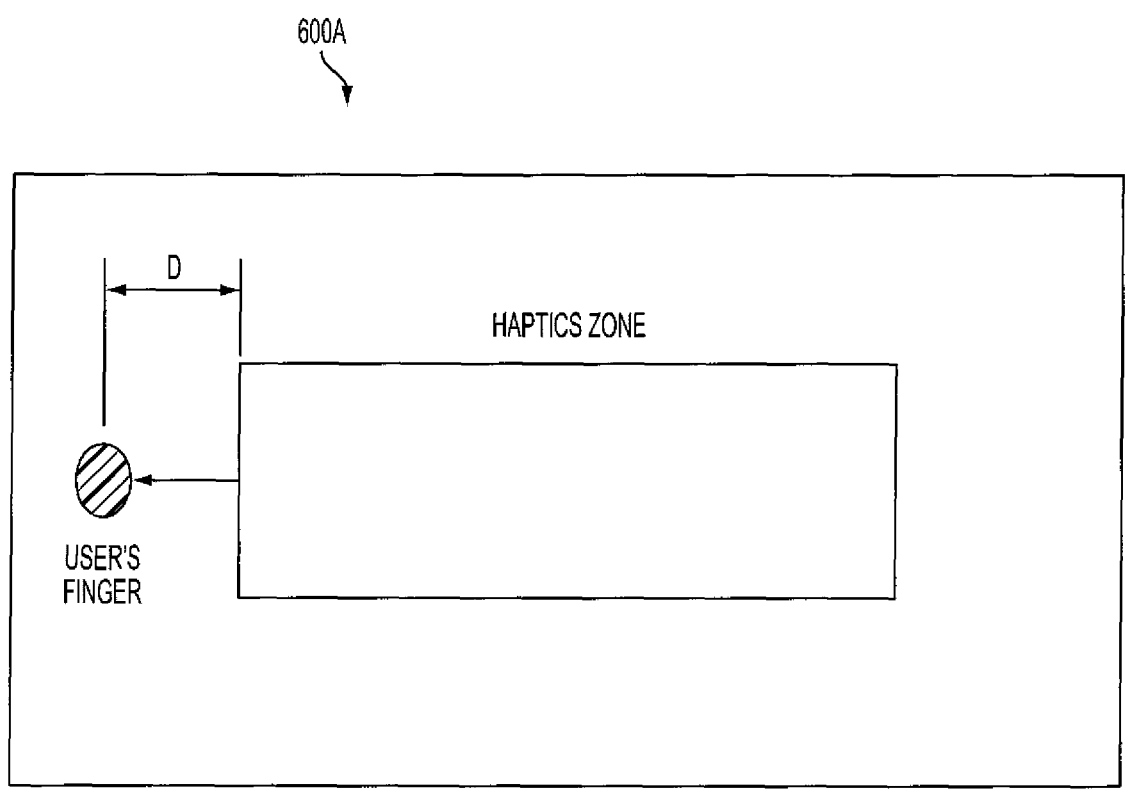
FIG. 6(A-B) illustrates examples of border and button simulation using haptic effects.

An embodiment may dynamically adjust the haptic effect, e.g., by its magnitude, frequency, direction, pattern, or the like, to simulate a border between touch and non-touch surfaces and/or between buttons or icons, or even to distinguish between buttons or icons. For example, referring to FIG. 6A, when a user's finger is moving out of (towards the edge of) a touch surface 600A, an embodiment may supply a haptic effect of increasing value, for example according to:

$$F = F_{base} + k * d$$

where $F_{base}$ is a base level of haptic effect or feedback (e.g., frequency, force or magnitude, duration), k is a co-efficient or tuning factor; and d is the distance traveled within the zone of interest. For example, where a user begins to approach the edge of a touch input surface 600A (e.g., touch pad), an embodiment may gradually increase the magnitude of haptic feedback supplied by a haptic layer such that the user is provided with a tactile cue informing him or her that the border is approaching. As will be appreciated, directionality may be built into the haptic effect, providing an additional level of tactile cue to the user.

Figure 6B:
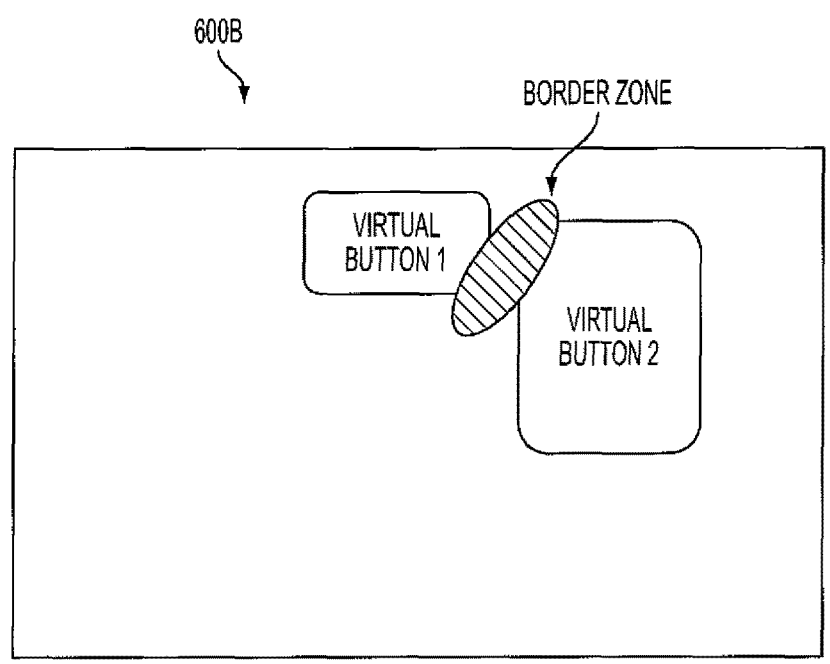

Similarly, referring to FIG. 6B, an embodiment may provide a haptic effect to give a tactile cue to the user that a transition between virtual buttons of a touch surface 600B has been detected. Thus, similar to the approaching of a border (based on detected user input, e.g., a finger moving across a touch surface 600B in a particular direction and at a particular location), an embodiment may provide a tactile cue that the user is providing input to the touch surface 600B that is moving away from a first virtual button or icon and approaching a second virtual button or icon. Accordingly, a user is provided with a tactile cue of where on the touch sensitive surface 600B he or she is without needing a visual or audible indication, although this feedback may be provided as additional feedback. Moreover, an embodiment may provide differing haptic effects for each virtual button (e.g., in response to user input with each virtual button zone), in addition to or in lieu of the border haptic effect. Thus, a user can ascertain via haptic feedback that a first virtual button is underneath his or her finger, that the user is transitioning between virtual buttons, and that a second virtual button is beneath his or her finger. Much the same may be provided for icons on a touch screen. These haptic effects are in addition to haptic effects matched to actions, e.g., haptic effects signifying execution of an underlying control.

Accordingly, embodiments provide programmed haptic effects to provide useful tactile cues to the user. These haptic effects may be programmed to indicate the location of various controls such as virtual buttons or icons on a touch sensitive surface. The haptic effects may additionally or alternatively be implemented to provide tactile cues indicative of a border or transition area or zone between two surfaces or portions of a surface, such as the border or zone around a touch sensitive surface or a border or zone between virtual buttons or icons. Therefore, embodiments provide additional tactile feedback to a user, supplementing the feedback conventionally given and making the increasingly complex touch surfaces easier to navigate and control, particularly for individuals not well suited for other types of feedback (e.g., audible or visible feedback).

As will be appreciated by one having ordinary skill in the art, one or more non-signal device readable medium(s) may be utilized in implementing the various embodiments. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
 a touch sensitive surface;
 one or more processors;
 a memory device storing instructions accessible to the one or more processors, the instructions being executable by the one or more processors to:
 detect one or more non-operational touch inputs to a border area dividing two touch sensitive sub-areas within the touch sensitive surface;
 map the one or more non-operational touch inputs to a predetermined haptic effect, wherein the predetermined haptic effect is based upon a context determined from an input type of the one or more non-operational touch inputs; and
 provide the predetermined haptic effect via a haptic layer of the touch sensitive surface.

2. The information handling device of claim 1, wherein the instructions are further executable by the one or more processors to:
 determine a directionality of non-operational touch inputs to the touch sensitive surface;
 wherein the predetermined haptic effect is modified according to the directionality of the one or more non-operational touch inputs.

3. The information handling device of claim 1, wherein the predetermined haptic effect is modified to increase a base haptic feedback level according to a reduction in distance on the touch sensitive surface between an operational region and the one or more non-operational inputs to the touch sensitive surface.

4. The information handling device of claim 3, wherein the base haptic feedback level is changed as the distance between the one or more non-operational touch inputs and a predefined border associated with an outer periphery of the touch sensitive surface changes.

5. The information handling device of claim 1, wherein the instructions are further executable by the one or more processors to determine a pressure at which a touch input selected from a non-operational touch input and an operational touch input is provided;
   wherein a predetermined haptic effect is mapped according to the pressure.

6. The information handling device of claim 1, wherein the instructions are further executable by the one or more processors to: detect one or more additional non-operational touch inputs to a second region of the touch sensitive surface;
   wherein a second predetermined haptic effect is provided via the haptic layer responsive to detecting the one or more additional non-operational touch inputs.

7. The information handling device of claim 1, wherein the touch sensitive surface comprises a touch pad.

8. The information handling device of claim 1, wherein the touch sensitive surface comprises a touch screen.

9. A method, comprising:
   detecting one or more non-operational touch inputs to a border area dividing two touch sensitive sub-areas within a touch sensitive surface of an information handling device;
   mapping the one or more non-operational touch inputs to a predetermined haptic effect, wherein the predetermined haptic effect is based upon a context determined from an input type associated with the one or more non-operational touch inputs; and
   providing the predetermined haptic effect via a haptic layer of the touch sensitive surface.

10. The method of claim 9, further comprising determining a directionality of non-operational touch inputs to the touch sensitive surface;
    wherein the predetermined haptic effect is modified according to the directionality of the one or more non-operational touch inputs.

11. The method of claim 9, wherein the predetermined haptic effect is modified to increase a base haptic feedback level according to a reduction in distance on the touch sensitive surface between an operational region and the one or more non-operational inputs to the touch sensitive surface.

12. The method of claim 11, wherein the base haptic feedback level is changed as the distance between the one or more non-operational touch inputs and a predefined border associated with an outer periphery of the touch sensitive surface changes.

13. The method of claim 9, further comprising determining a pressure at which a touch input selected from a non-operational touch input and an operational touch input is provided;
    wherein a predetermined haptic effect is mapped according to the pressure.

14. The method of claim 9, further comprising detecting one or more additional non-operational touch inputs to a second region of the touch sensitive surface;
    wherein a second predetermined haptic effect is provided via the haptic layer responsive to detecting the one or more additional non-operational touch inputs.

15. The method of claim 9, wherein the touch sensitive surface comprises a touch pad.

16. The method of claim 9, wherein the touch sensitive surface comprises a touch screen.

17. A computer program product, comprising:
    a storage medium having computer readable program code embodied therewith, the computer readable program code being executable by a processor and comprising:
    computer readable program code that detects one or more non-operational touch inputs to a border area dividing two touch sensitive sub-areas within the touch sensitive surface;
    computer readable program code that maps the one or more non-operational touch inputs to a predetermined haptic effect, wherein the predetermined haptic effect is based upon a context determined from an input type associated with the one or more non-operational touch inputs;
    computer readable program code that provides the predetermined haptic effect via a haptic layer of the touch sensitive surface.

* * * * *